United States Patent
Hallen

(10) Patent No.: US 11,827,301 B2
(45) Date of Patent: Nov. 28, 2023

(54) MOTORIZED FOOT PEG FOR A MOTORCYCLE

(71) Applicant: Martin Hallen, Camarillo, CA (US)

(72) Inventor: Martin Hallen, Camarillo, CA (US)

( * ) Notice: Subject to any disclaimer, the term of this patent is extended or adjusted under 35 U.S.C. 154(b) by 170 days.

(21) Appl. No.: 17/527,605

(22) Filed: Nov. 16, 2021

(65) Prior Publication Data
US 2022/0153376 A1 May 19, 2022

Related U.S. Application Data

(60) Provisional application No. 63/114,922, filed on Nov. 17, 2020.

(51) Int. Cl.
*B62J 25/06* (2020.01)
*B62J 45/20* (2020.01)

(52) U.S. Cl.
CPC .............. *B62J 25/06* (2020.02); *B62J 45/20* (2020.02)

(58) Field of Classification Search
CPC .................................. B62J 25/06; B62J 45/20
See application file for complete search history.

(56) References Cited

U.S. PATENT DOCUMENTS

| | | | |
|---|---|---|---|
| 6,893,038 B2* | 5/2005 | Egan | B62J 25/06 74/564 |
| 7,104,157 B1* | 9/2006 | Hilliard | G05G 1/60 74/564 |
| 7,431,118 B1* | 10/2008 | Hogg | B62J 25/04 74/564 |
| 7,497,291 B1* | 3/2009 | McKim | B62J 25/04 280/291 |
| 7,757,583 B1* | 7/2010 | Reading | G05G 1/60 74/564 |
| 7,997,604 B2* | 8/2011 | Griep | B62J 25/04 74/564 |
| 8,696,009 B1* | 4/2014 | Heath, Sr. | B62J 25/04 D12/114 |

* cited by examiner

*Primary Examiner* — Tony H Winner
(74) *Attorney, Agent, or Firm* — SoCal IP Law Group LLP; Mark A. Goldstein; Brian S. Tamsut

(57) ABSTRACT

A motorized foot peg controlled wirelessly or via a cable connection for use with motorcycles and other vehicles is described herein.

17 Claims, 6 Drawing Sheets

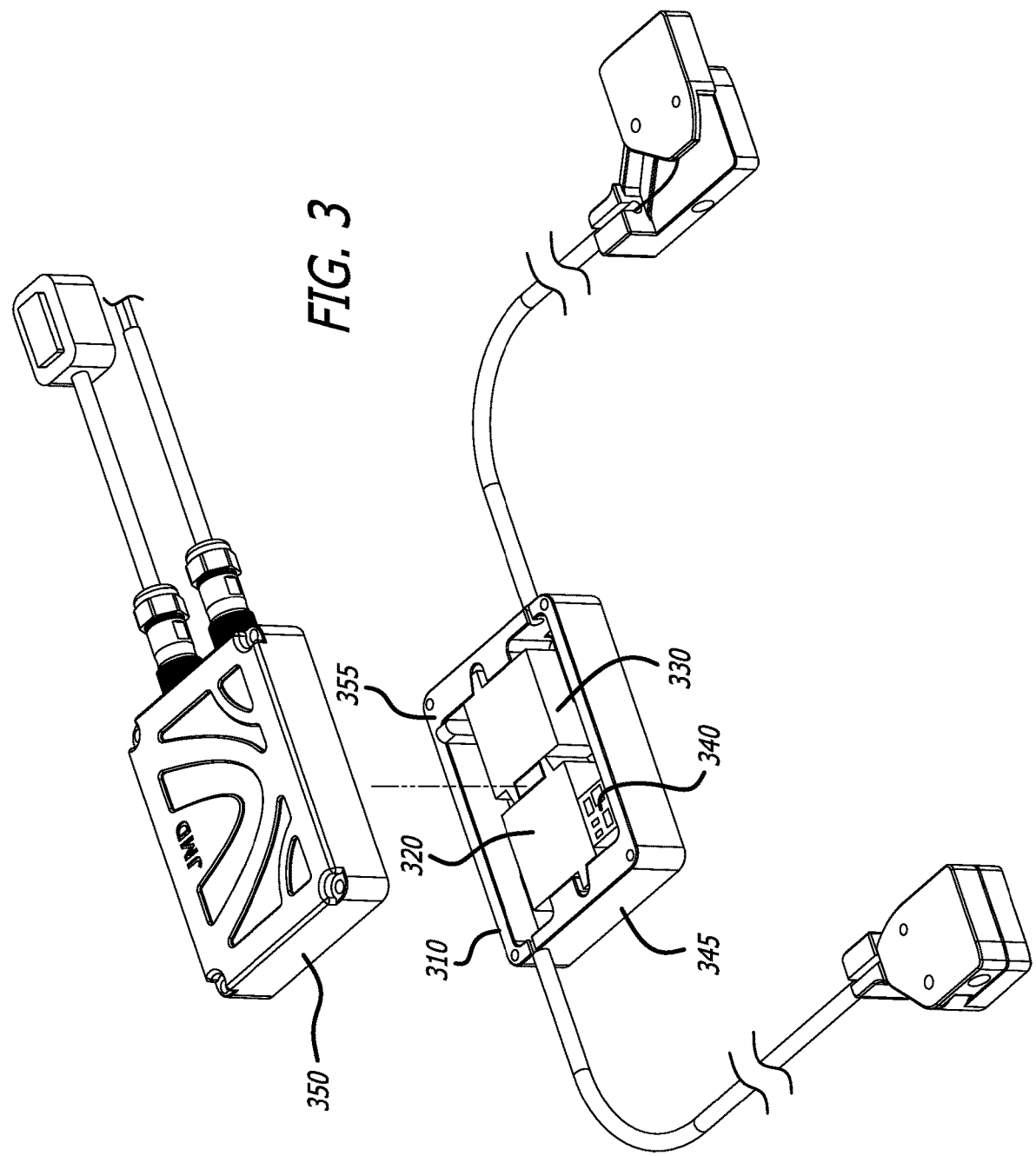

MOTORIZED FOOT PEG FOR A MOTORCYCLE

RELATED APPLICATION INFORMATION

This patent claims priority from provisional patent application No. 63/114,922 filed Nov. 17, 2020, the contents of which are included herein by reference in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to motorcycle foot pegs and control mechanisms for both wires and wireless use of the pegs.

Description of the Related Art

Riding a motorcycle or similar vehicles requires much skill and balance from the rider. Along with maintaining balance, riders must use apparatuses exclusive to motorcycles such as foot pegs to keep balance. Motorcycle foot pegs (sometimes known as highway pegs) are often attached to a crash bar and are designed to allow a motorcyclist to put/rest their feet off the side of the motorcycle, primarily for highway and other long uninterrupted driving use. The traditional foot pegs or highway pegs attached to the crash bar are pivotally movable between retracted and extended positions via a manual ball detent mechanism that is moved by the rider's feet while driving. This movement of the feet is often difficult to perform while driving and can cause distractions and may force a rider to become unbalanced, a huge safety concern for an already dangerous activity. There needs to be a safer way for a rider to cause rotation or movement of a foot peg.

DESCRIPTION OF THE DRAWINGS

FIG. 3 is a drawing of a control box.

Figure 1:
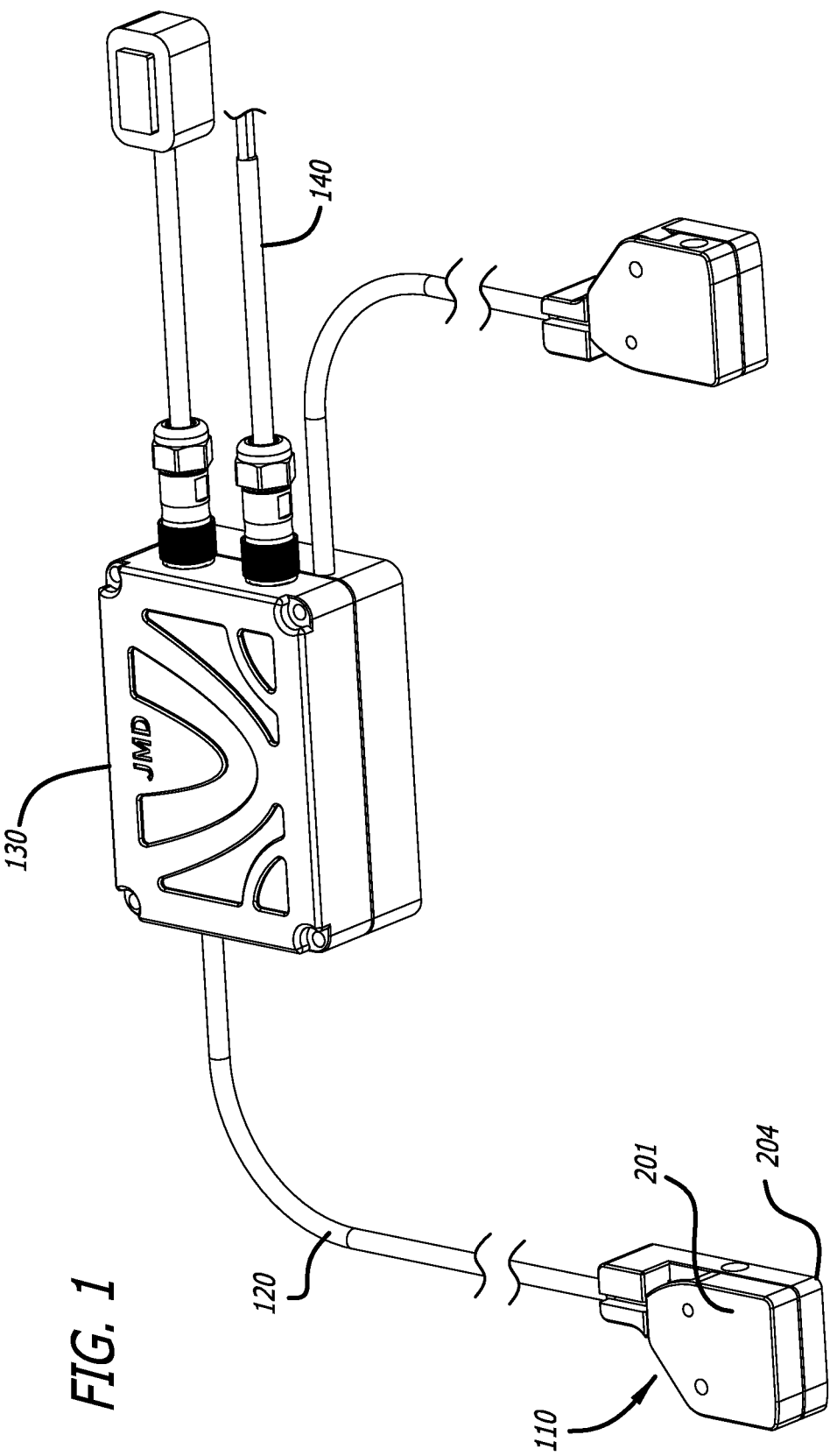
FIG. 1 is an overall diagram of the motorized foot peg device.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

The motorized foot peg described herein can raise and drop, open or close, engage or not be engaged based on a signal or instructions received from a controller. Upon receipt of a signal or instructions from a controller, the foot pegs raise vertically or flip out or up horizontally (using the ground as a reference), open or close, become engaged or not engaged. In this way, the motorized foot peg is remote controlled. The controller includes a button, toggle or another similar switch or control mechanism. The controller is coupled with the motorized foot peg by wired connection or by wireless connection. In one embodiment, the controller is located on or near the handlebar. In this embodiment, the controller is coupled to the motorized foot peg by wired connection or by wireless connection. When the controller attached to a handlebar is coupled to the motorized foot peg via a wire or wires, the wire or wires are run between the controller and the motorized foot peg through and/or along the handlebar and crash bar, and may be arranged with other cables such as brake cables or other cables.

When the controller is coupled to the handlebar, the controller may have a wireless connection to the motorized foot peg, or control box. Wireless connections include Bluetooth, Zigbee, RFID, RF, and others. In another embodiment, the controller may be located on the rider's helmet or may be clipped to clothing of the rider. In this embodiment, the controller has a wireless connection to the motorized foot peg. In some embodiments, an application on a smartphone, smartwatch, or portable digital device may interact with the motorized foot peg and control box to let the rider control the pegs.

The controller may include multiple components including a battery, a touch screen, a button, switch, toggle, a computer processor, firmware, and a chip or chipset that provides support for wireless communication. The controller may include a resin, plastic, metal or other sufficiently strong, resilient and lightweight housing in which the components reside.

The motorized foot peg may be connected to the crash bar of a motorcycle. In some embodiments the motorized foot peg may include a foot peg assembly (or two foot pegs composed from two blocks), a motor, and a foot peg manager unit (or control unit or control box). The foot peg manager unit may include multiple components including a battery, a computer processor, firmware, and a chip or chipset that provides support for wireless communication. The foot peg manager unit may include a resin, plastic, metal or other sufficiently strong, resilient and lightweight housing in which the components reside. The foot peg manager unit of the motorized foot peg may be coupled by wired connection or wireless connection to the controller. The foot peg assembly may include hinges, pistons and/or joints that enable and allow the foot peg to move from a passive position (where the foot peg is not engaged) to an active (deployed, the foot peg is engaged) states or positions when the motor is activated by the foot peg manager unit. The motor moves the foot peg from passive to active positions along the hinges, and/joints, and vice versa, in response to receiving a signal or instructions from a controller. The movement may be vertical or horizontal in different embodiments. In one embodiment, the foot peg manager unit may be incorporated with the hinges, pistons and/or joints such that the hinges, pistons and/or joints combined with the foot peg manager unit form one assembly.

The motorized foot peg described and shown herein, unlike the current manual mechanisms on crash bars, is actuated with a controller and, as such, allows for a safer, simpler transition of the foot peg, thus preventing any distractions and or possible resulting harm such as accidents.

FIG. 1 is an overall diagram of the motorized foot peg (which may also be referred to as a highway peg). A foot peg 110 is attached to an actuating cable 120. The actuating cable is attached to a control box 130. The control box 130 is discussed in more detail below, but for purposes of this figure, the control box houses a motor that engages actuation cable 120 and causes movement of foot peg 110. Power cable 140 is in communication with the control box 130 and obtains power from an external source such as a battery or a motorcycle's own internal electrical system.

Figure 2A:
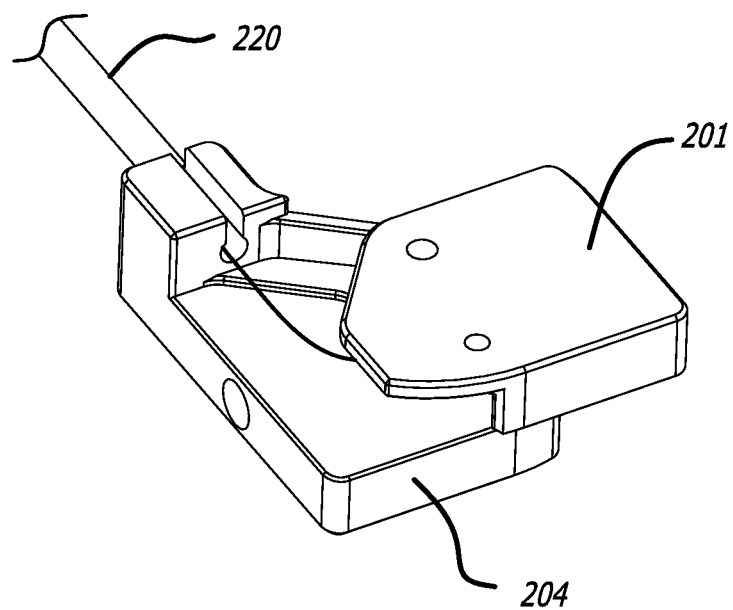
FIG. 2A and FIG. 2B are drawings of two foot pegs.
Figure 2B:
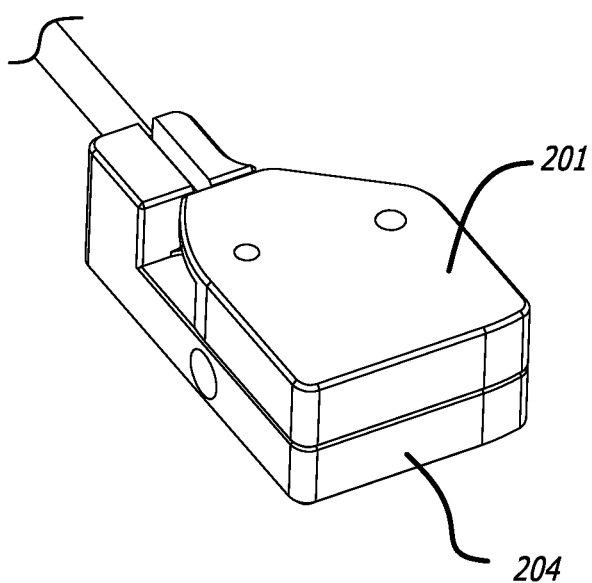

FIGS. 2A and 2B contain a picture of the two peg pivots one engaged and one not engaged. These may be thought of as an open state, shown in FIG. 2A, and closed state, shown in FIG. 2B. Both pivots are composed of a first block 201 and a second block 204. Foot peg 110 shown in FIG. 1 includes first block 201 and second block 204 from FIG. 2. The two blocks are connected at a rotational axis of the first and second block, the first and second block may also rotate between 1 and 120 degrees relative to one another. The motors may apply tension to counteract a coil spring and pull the pivots down. The peg pivots are configured to turn the linear motion of a pulling cable into the rotation of one block of a peg pivot. So as one block remains stationary, the other may pivot allowing a rider to put their feet on the block. The peg pivots may come in two forms based on their use closed which is engaged, and open which is not engaged. When the peg pivot is closed (engaged) (FIG. 2B) the two blocks have not rotated against each other, and a rider will likely not rest their feet on the pegs. When the peg pivots are open (not engaged) (FIG. 2A), the motor has been engaged and the pivots have rotated against each other, allowing the rider to rest their feet on one of the blocks of the peg pivot.

Actuating pull cables 220 are used to transfer mechanical energy from the motor to the foot pegs. The actuating pull cables are attached to a foot peg and control box. In some instances, the actuating pull cable may be composed of an outer sheathing and an inner steel cable disposed within the outer sheathing, a threaded cap at the end of each side of the actuating pull cable, and an eyelet at both ends of the cable. In one embodiment, the actuating cable is about 3 feet in length. In other embodiments, the actuating cable is at least 3 feet in length and may be longer. In some embodiments, it may be favorable to use mountain bike brake cables or auto industry cables may be used as an actuating cable.

Block 201 and/or 204 may further be connected to a crash bar of a motorcycle by a fastener, the second block 204 connected to the first block 201 via a bolt with a torsion spring which applies an opening force against the first and second block, the second block attached to the end of an eyelet of the actuating pull cable at a mounting hole on the foot peg. A crash bar may be selected as a connection point because crash bars are often made entirely of metal and are very sturdy. However other areas of a motorcycle that are sturdy may also serve as a point of connection. For example, if a motorcycle comes with a rear or front footrest, those areas may serve as the preferred connection point.

The actuating pull cable may be composed of different materials. A steel cable, mountain bike brake cable, or even automobile brake cable may be used as an actuating pull cable. The actuating pull cable may further comprise an outer sheathing and an inner steel cable disposed within the outer sheathing, a threaded cap at the end of each side of the actuating pull cable, and an eyelet at both ends of the cable.

FIG. 3 is a picture of a control box. Control box 310 may house at least one motor 320. In FIG. 3 a first servo motor 320 and second servo motor 330 are shown. Additionally, the control box may house a control unit 340. The control unit may be a fabricated circuit board, computer or other computation device, such as, for example a RASPBERRY PI single board computer, capable of processing and sending a signal. The control unit within the control box may receive a signal from a rider to activate and extend the pivot pegs to rest their feet on, and in response, the control unit activates the cables. The control box may be constructed by combining a control box bottom 345, with a control box top 350. The control box top and bottom may have several fastener holes 355. These faster holes may house a screw that can be used to tighten the control box bottom shut. Other fastening devices and techniques may be used to close the control box.

The control box may also have a plurality of threaded holes, a first and second hole for connecting a pull cable mounting, a third hole for a 2 pin connector for use with a power cable, a 2 pin connector for use with a signal transfer cable. The 2 pin connector may also be a different type of connector point or just a hole. For example, a USB connection port, Micro-USB connection port, twisted-pair connectors, coaxial cable connectors, fiber-optic connectors, or area in which cables may be spliced could be used instead. The threaded holes provide a more stable connection of components, and also contribute to the weatherproofing of the entire apparatus. The signal transfer cable may include a sheathed cable housing, a first inner wire and a second inner wire for transferring a signal, the signal transfer cable having a distal end connected to a switch, and a proximal end connected to a connector plug.

The electronics control box as shown houses at least two servo motors. The servo motors contain a rotary actuator or linear actuator to allow for precise control of angular or linear position, velocity, and acceleration. Alternatively, step motors (sometimes referred to as stepper motors or step motors) may be used. In the experience of the inventors, servo motors are better because they are more precise in movement and control. These servo motors may be programmed to rotate between 0 and 180 degrees or to rotate at 90 degrees. Other servo motors may also be configured to go to any degree existing between 0 and 180. The motors may then be connected to a control unit, the control unit may further consist of a printed circuit board.

Additionally, the motorized foot peg may be outfitted with a servo motor(s) (sometimes referred to as a Servomotor or servomotor) in which the servo motor has a steel horn which is connected to an eyelet of a pull cable, transforming the rotational motion of the motor into linear motion which the pull cable transfers to the peg pivots. The addition of a steel horn and eyelet of a pull cable makes the entire cable sturdier and last longer. The foot peg will likely be engaged every time a motorcyclist rides a motorcycle. A regular cable, or a cable without a steel horn or eyelet, will likely wear out faster than a cable with a steel horn and/or eyelet. Additionally, a connection without an eyelet could also be more vulnerable to slippage which would render a similar system broken. That is, though the cable may not break, it would be rendered useless by slippage.

The control box may be weatherproofed as the motorcycle will likely be used outside and exposed to the elements. Weatherproofing may be achieved by applying gaskets to openings. The control box bottom 345 and control box top 350 may be constructed from metal such as stainless steel or aluminum, or in other cases certain plastics. In one embodiment, a lip from the control box top or bottom may feed into a cavity of the complementary part which will further prevent water or other foreign matter from entering the control box.

Figure 4:
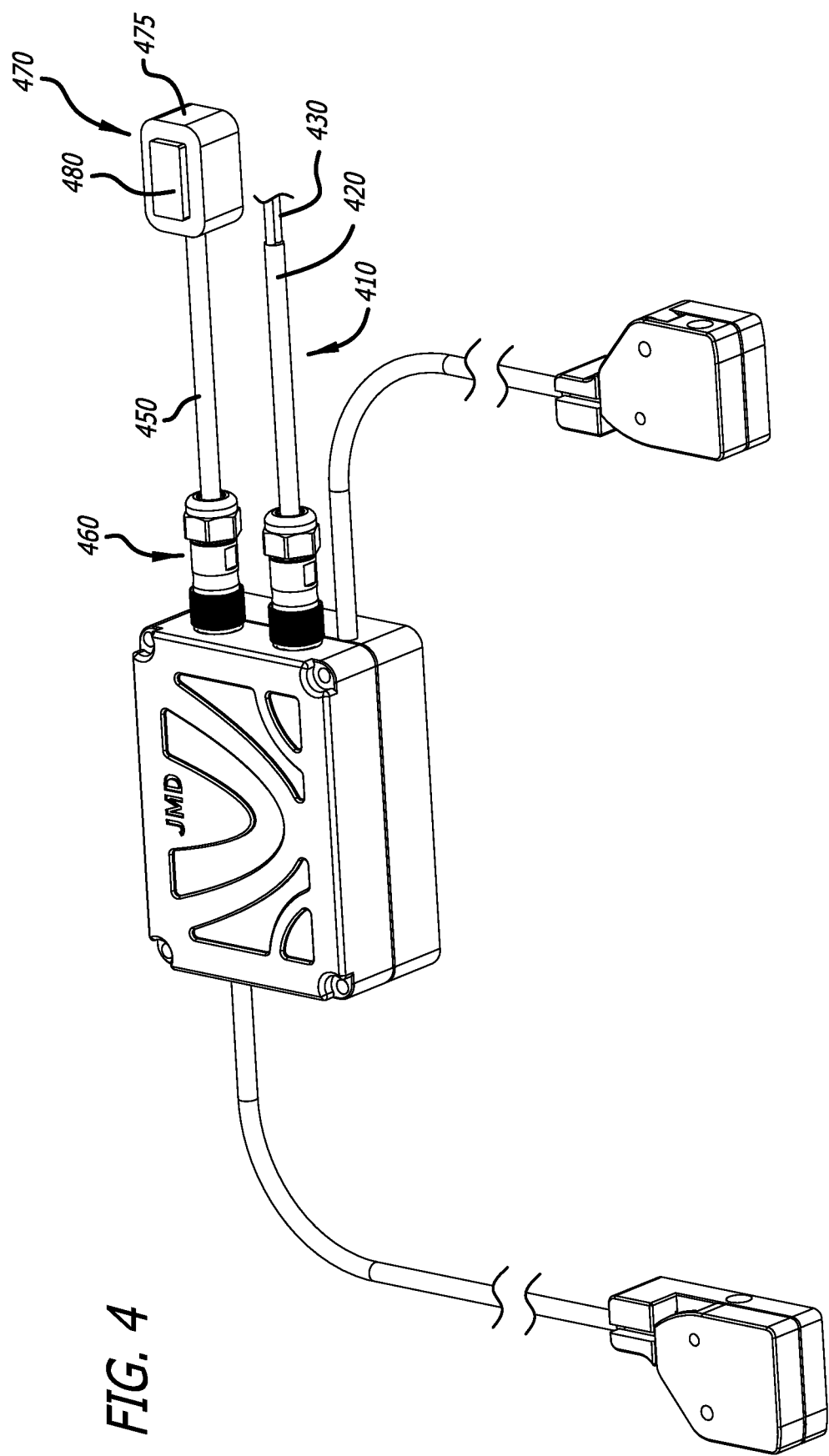
FIG. 4 is a drawing of the motorized foot peg highlighting the power cable.

FIG. 4 is a picture of the system with an emphasis on the power cable. The power cable 410 attaches to the control box on one side, and a power source on the other. The power source may often be electricity from a battery. The power cable may be attached directly to a battery, or internal wiring from a motorcycle that is attached to the battery of the motorcycle. In other instances, a separate power source that is apart from the motorcycle's own power source may be used such as an external battery pack.

If the motorcycle's own internal power source is used there are several options. Most motorcycles on the road today utilize lead acid or lithium ion battery power source to power electronic components used on the motorcycle. These batteries are often recharged by the mechanical motor of the bike and are often run by an engine powered by gasoline. As electric motorcycles become ubiquitous, the lithium ion battery or other electronic battery source that fuels the mechanical movement of the motorcycle may be tapped into by the power cable.

The power cable may also be used to power a PCB which then powers and controls motors within the control box. The power cable may be composed of sheathed cable housing 420 and two inner wires 430 which are exposed at one end in order to be spliced into the motorcycle power and a fastener at the other end of the connector plug. In some instances, the sheathing for the cables may be a PVC jacket. A conductor and insulation may be found within the sheathing along with talcum. More specifically the conductor may be 14 AWG and be made of tinned copper. The insulation may be 0.23 MM thick and made out of 80° C.-PVC. The sheathing may be 0.76 MM thick and be composed of half matt PVC.

Signal transfer cable 450 may be used to transfer a signal from a rider that they want to engage the foot peg. The signal transfer cable may be used to transmit one of two signals on or off. In some instances when in the off position, no electricity is run through the cable which causes no mechanical movement of the motor or power control box and thus the peg pivot is in the closed position. In the on or engaged position, a circuit is completed, and electric current is run through the power cable which in turn goes to the power control box and activates the motor(s) which in turn engages the mechanical foot peg. Other forms of signals may be used via the signal transfer cable. For example, in one embodiment, a continuous stream of electricity or signal may run through the cable which in turn signals the power control box to not engage the motor. In this embodiment, only when this signal is cut or put in the off position does that signal the motor to engage and the peg to move.

In some instances, the signal transfer cable may consist of a sheathed cable housing and two inner wires. One end of the signal transfer cable may pass into a handlebar switch box and connect to a rocker switch. The other end of the signal transfer cable may be connected to a connector plug 460. The connector plug can be used to put the signal control switch 470 in communication with the control box.

Signal control switch 470 may include a switch 480 and control switch housing 475. A rocker switch may be used as is shown in the drawings however other switches such as a selector switch, joystick, limit switch, proximity switch, speed switch, pressure switch may also be used. Additionally, some vehicles on the market come with touchscreen or infotainment systems that also control aspects of a vehicle such as lighting, radio, and signals. Touchscreens or other systems may be configured to provide a digital option of a switch that can allow a user to either turn off or on the pivot pegs. A control switch housing is important because motorcycles are often used outside and exposed to the elements.

If conventional components are used, they may not hold up to the demands of the environment, such as extreme weather including rain, sleet hail, or excessive wind created either by nature or when the motorcycle is moving at high speeds. Proper mounting of the control switch and other components is also imperative due to the high speed at which motorcycles are used. Conventional components should be avoided when constructing the device because they may deteriorate over time, be too delicate or may fall off when the motorcycle is traveling at high speeds.

Figure 5:
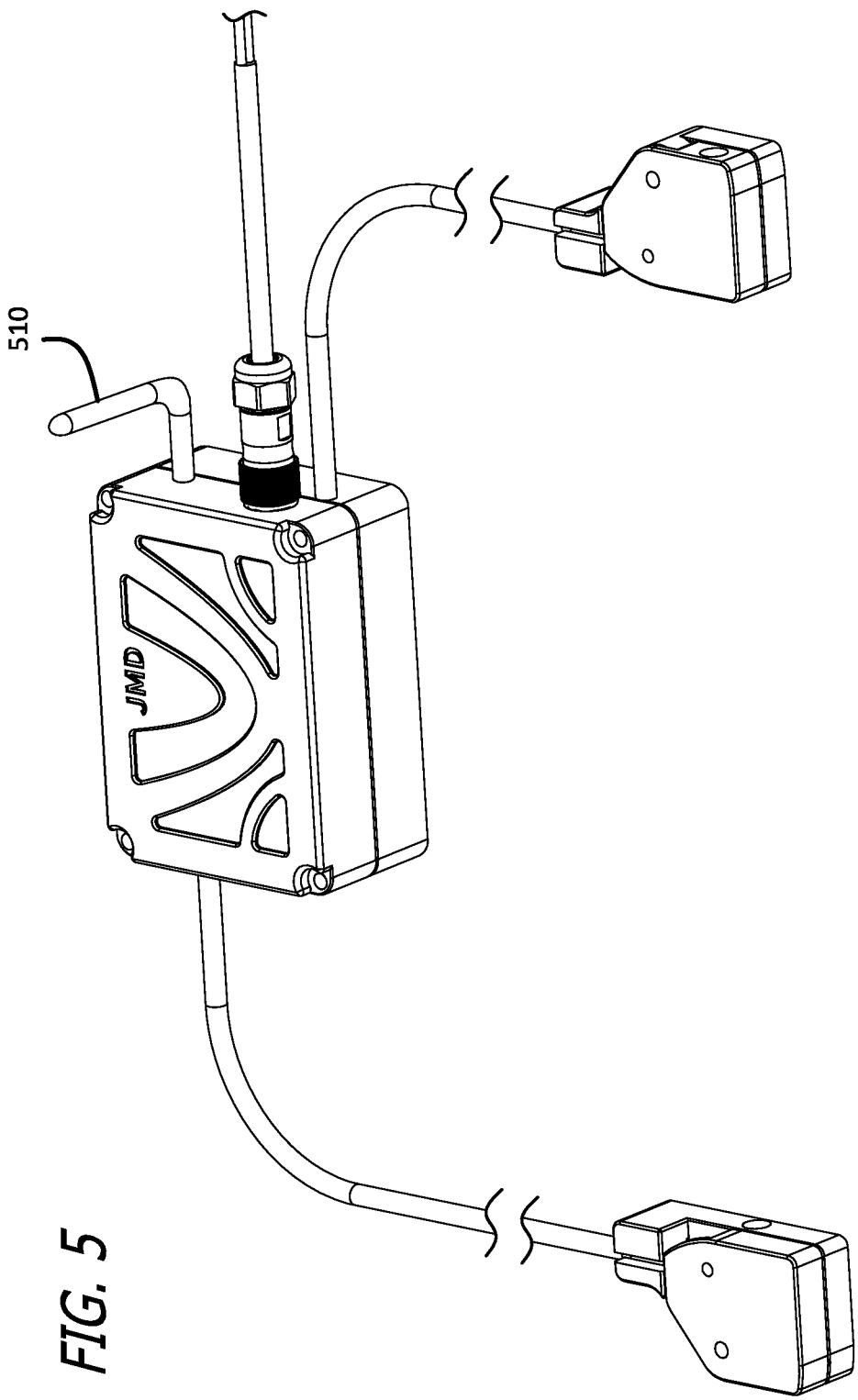
FIG. 5 is a drawing of the motorized foot peg utilizing a wireless receiver.

FIG. 5 is a diagram of an embodiment of the system where a wireless receiver is utilized instead of a signal control cable. In other embodiments, the electronic control box may be in connection with a signal receiver 510. The signal receiver may be used in lieu of a signal transfer cable to wirelessly receive a request to activate the motor which in turn activates the motorized foot peg. The signal receivers must have the ability to process a wireless signal. A receiver utilizing Bluetooth may be used, and other signals may be used including AM Radio (around 10 MHz), FM Radio (around 100 MHz), television (470 MHz to 800 MHz), cellular telephone (850 MHz, 1900 MHz), Wi-Fi (2.4 GHz), and satellite (3.5 GHz, and 5 GHz). The receiver may receive a modulated or unmodulated signal to signal the device to open or close. The receiver may itself be an antenna or be outfitted with an antenna.

The composition of the device is very particular and special components must be used. Certain conventional components will not work due to the outdoor use of most motorcycles. Although some may want to use other pieces of machinery to construct the motorized foot peg, other pieces of machinery meant for indoor use may not hold up well when exposed to wind, air, and other elements.

Figure 6:
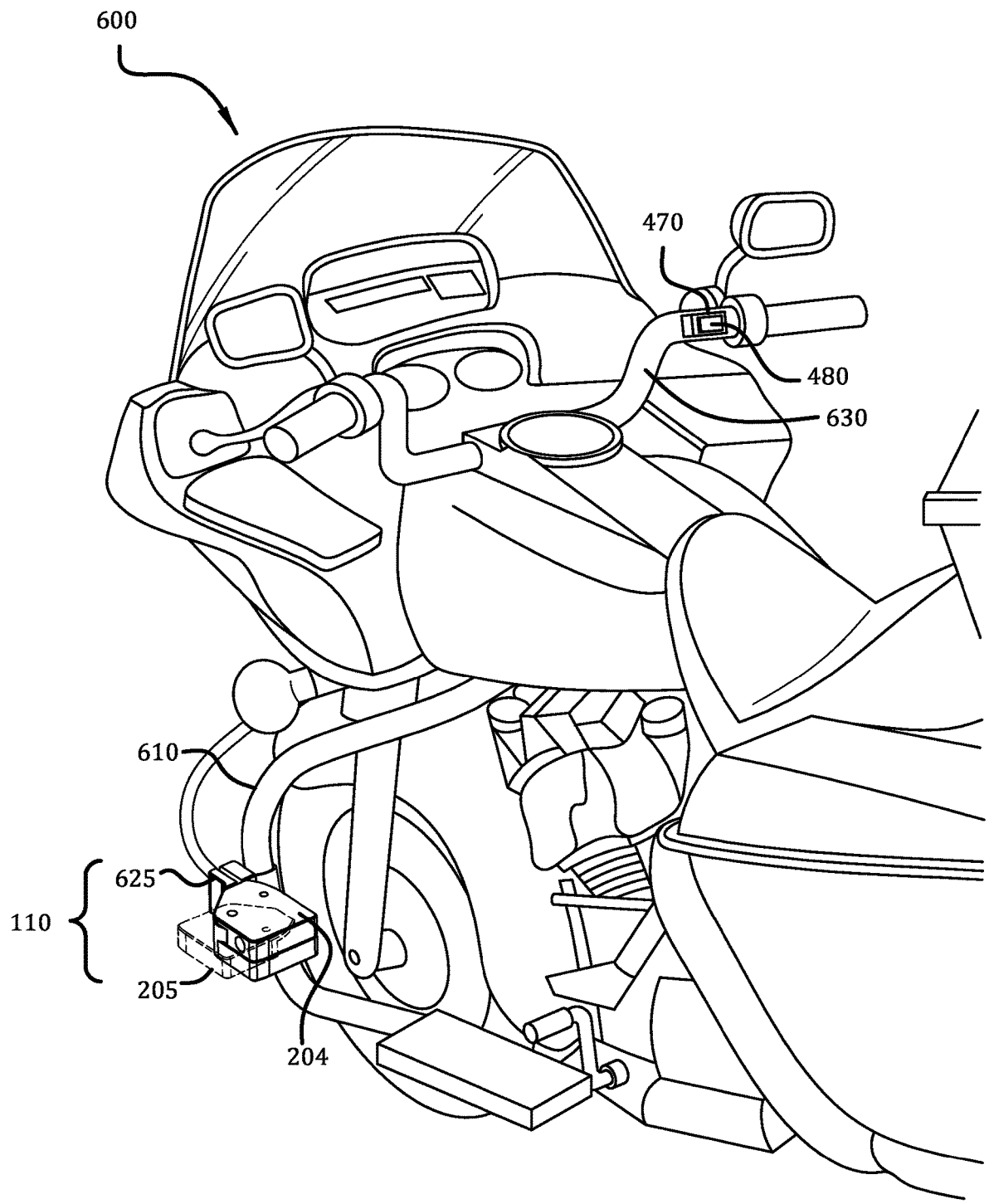
FIG. 6 is a drawing of the motorized foot peg attached to a motorcycle.

FIG. 6 is a diagram of the foot pegs used on a motorcycle. Motorcycle 600 has crash bar 610. Crash bar 610 is often constructed of metal and made from a sturdy construction. The purpose of a crash bar is often to prevent a rider from injury in the event of a crash. The sturdy construction makes the crash bar an ideal place to attach the motorized foot peg. First block 204 may rotate to position 205 (open state) in foot peg 110. Note in FIG. 6 the blocks appear to be rotating from side to side. However in other embodiments, the blocks and foot pegs may be oriented in many other directions, for example they could move up and down or diagonal depending on how the rider's feet will be placed, with respect to the crash bar or motorcycle. Additionally, a footrest (not shown) may be attached to one of the pegs, the rider's feet need not be placed directly on the peg, but may be placed on a footrest placed on a top of the peg. In other embodiments one of the pegs or blocks themselves may serve as or be a footrest for a rider to place a foot on. Fastener 625 is also present which connects foot peg 110 to crash bar 610. Handlebar 630 has affixed to it signal control switch 470 which contains switch 480. Note in other embodiments, control switch 470 may be found in other areas such as a rider's helmet, a piece of clothing, or software on a smartphone or computing device.

Attaching the foot pegs to a crash bar is also beneficial because current foot pegs are often positioned right below the driver, or right below the passenger. Attaching the foot peg to a sturdy point of a crash bar allows the rider's legs to be in an extended stretched and relaxed position which is conducive to safety. The pegs are often used when cruising on long stretches of road and thus having a rider's legs in a comfortable position is important.

Additionally, a kit with the components described above and shown in the drawings may be provided and assembled to create a motorized foot peg. The kit includes components for making a motorized foot peg comprising at least two peg pivots, each peg pivot comprising a first block and a second block configured to be attached to a rotational axis of the first and second block, the first and second block rotating at between 1 and 120 degrees relative to one another; the peg pivots configured to transform the linear motion of an actuating pull cable into the rotational path of one block of a peg pivot; an actuating pull cable connectable to a motor and the peg pivots, the actuating pull cable configured to transfer the motion of the motor to the peg pivots; an electronic control box containing at least one motor attached to the actuating pull cable and a control unit; a power transfer cable connectable to a power source a control unit and a motor a signal transfer cable or signal receiver connectable to a handlebar switch and a control unit a handlebar controller.

Along with conventional two wheel motorcycles, the device may be used with other wheeled vehicles such as electric bicycles, mopeds, three wheel bicycles or motorcycles, ATVs, off roading vehicles. It may also be used with jet skis, skimobiles, or other vehicle that require a rider maintain balance and rest their feet somewhere.

Unlike conventional footrests for motorcycles the present invention may be utilized for highway pegs often found on motorcycles. Because highway pegs are often used on long stretches of road, they are subject to extra stress from the prolonged weight and force applied by a rider's feet for prolonged periods of time. Connecting the highway pegs to the crash bar allows the rider to have extended stretched/relaxed legs, allowing for a cruising position on highways or long stretches of road. Constructing a foot peg from two blocks as opposed to a single member system or even multimember system is advantageous because two blocks add physical resilience to the system. Traditional single member foot pegs, or even pegs not constructed from blocks often break during riding and are not safe or long lasting.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A motorized foot peg for a motorcycle comprising:
   at least one peg pivot, the at least one peg pivot comprising a first block and a second block connected at a rotational axis of the first and the second blocks, the first and the second blocks rotating at between 1 and 120 degrees relative to one another; the at least one peg pivot configured to transform the linear motion of an actuating pull cable into the rotational path of one of the first and second blocks;
   the actuating pull cable attached to at least one motor and the at least one peg pivot, the actuating pull cable configured to transfer the motion of the at least one motor to the at least one peg pivot;
   an electronic control box containing the at least one motor and a control unit; a power transfer cable attached to a power source, the control unit and the at least one motor; a signal transfer cable attached to a handlebar switch and the control unit; a handlebar controller; and wherein the first block is connected to a crashbar of the motorcycle by a fastener, the second block connected to the first block via a bolt with a torsion spring which applies an opening force against the first and second blocks, the second block attached to an end of an eyelet of an actuating pull mounting hole.

2. The motorized foot peg of claim 1 wherein the actuating pull cable further comprises an outer sheathing and an inner steel cable disposed within the outer sheathing, a threaded cap at an end of each side of the actuating pull cable, and the eyelet at both ends of the pull cable.

3. The motorized foot peg of claim 1 wherein the at least one motor further includes at least two servo motors programmed to rotate between 0 and 180 degrees or to rotate at 90 degrees;
   the electronic control box houses the at least two servo motors and the control unit; and
   Wherein the control unit comprising a printed circuit board and a signal receiver.

4. The motorized foot peg of claim 3 wherein the at least one peg pivot further includes two peg pivots; each of the at least two servo motors has a steel horn which is connected to the eyelet of the actuating pull cable, transforming the rotational motion of each motor into linear motion which the actuating pull cable transfers to each of the two peg pivots, respectively.

5. The motorized foot peg of claim 1 wherein the control box has a plurality of threaded holes, a first and second hole for connecting a pull cable mounting, a third hole for a 2 pin connector for use with the power transfer cable, a fourth 2 pin connector for use with the signal transfer cable.

6. The motorized foot peg of claim 1 wherein the signal transfer cable further comprises a sheathed cable housing, a first inner wire and a second inner wire for transferring a signal, the signal transfer cable having a distal end connected to a switch, and a proximal end connected to a connector plug.

7. The motorized foot peg of claim 1 wherein the handlebar controller includes a housing with a first port for a rocker switch, a second port for receiving the signal transfer cable, and a mounting to attach the handlebar switch to a handlebar of the motorcycle.

8. A motorized foot peg for a motorcycle comprising:
at least one peg pivot, the at least one peg pivot comprising a first block and a second block connected at a rotational axis of the first and the second blocks, the first and the second blocks rotating at about 100 degrees relative to one another; the at least one peg pivot configured to turn the linear motion of an actuating pull cable into the rotation of one of the first and second blocks; an actuating pull cable attached to the at least one motor and the at least one peg pivot, and configured to transfer the motion of the at least one motor to the at least one peg pivot; an electronic control box containing the at least one motor a control unit, and a signal receiver; a power transfer cable attached to a power source, the control unit and the at least one motor;
a controller configured to send a signal to the signal receiver, the signal receiver configured to engage the control unit to control the at least one motor to activate the at least one peg pivot
wherein the first block is connected to a crash bar of the motorcycle by a fastener, the second block is connected to the first block via a bolt with a torsion spring which applies an opening force against the first and second block, the second block is attached to an end of an eyelet of an actuating pull cable mounting hole.

9. The motorized foot peg of claim 8 wherein the actuating pull cable further comprises an outer sheathing and an inner metal cable disposed within the outer sheathing, a threaded cap at an end of each side of the actuating pull cable, and the eyelet at both ends of the inner metal cable.

10. The motorized foot peg of claim 8 wherein the at least one motor further includes at least two servo motors programmed to rotate between 0 and 180 degrees or to rotate at 90 degrees;
the electronic control box houses the at least two servo motors and the control unit; and
wherein the control unit comprising a printed circuit board and a signal receiver.

11. The motorized foot peg of claim 8 wherein the at least one peg pivot further includes two peg pivots; and
each of the at least two servo motors has a steel horn which is connected to the eyelet of the actuating pull cable, transforming the rotational motion of each motor into linear motion which the actuating pull cable transfers to each of the peg pivot, respectively.

12. The motorized foot peg of claim 8 wherein the control box has a plurality of threaded holes, a first and second hole for connecting a pull cable mounting, a third hole for a 2 pin connector for use with the power transfer cable.

13. The motorized foot peg of claim 8 wherein the signal transfer cable further comprises a sheathed cable housing, a first inner wire and a second inner wire, the signal transfer cable having a distal end connected to a switch, and a proximal end connected to a connector plug on the motorcycle.

14. The motorized foot peg of claim 8 wherein the controller is a smartphone, a smartwatch, or a portable digital device.

15. The motorized foot peg of claim 8 wherein the controller is a computer within a helmet.

16. A kit for making a motorized foot peg comprising:
at least two peg pivots, each peg pivot comprising a first block and a second block configured to be attached to a rotational axis of the first and the second block, the first and the second block rotating at between 1 and 120 degrees relative to one another; the peg pivots configured to transform the linear motion of an actuating pull cable into the rotational path of one block of a peg pivot; an actuating pull cable connectable to at least one motor and the peg pivots, the actuating pull cable configured to transfer the motion of the motor to the peg pivots; an electronic control box containing the at least one motor attached to the actuating pull cable and a control unit;
a power transfer cable connectable to a power source a control unit and the at least one motor;
a signal transfer cable or signal receiver connectable to a handlebar switch and the control a handlebar controller;
wherein the first block is configured to be attached to a crashbar of the motorcycle by a fastener, the second block configured to be attached to the first block via a bolt with a torsion spring which applies an opening force against the first and second block, the second block configured to be attached to an end of an eyelet of the actuating pull cable at a mounting hole.

17. The kit of claim 16 wherein the at least one motor further includes at least two servo motors programmed to rotate between 0 and 180 degrees or to rotate at 90 degrees; and the electronic control box houses the at least two servo motors and the control unit; and
wherein the control unit comprising a printed circuit board.

* * * * *